United States Patent Office.

CARL FRIEDRICH LUDWIG WANDEL, OF WALDAU, NEAR BERNBURG, NORTH GERMAN CONFEDERATION, ASSIGNOR TO F. O. MATTHIESSEN AND W. A. WIECHERS, OF NEW YORK, N. Y.

Letters Patent No. 90,617, dated May 25, 1869.

IMPROVEMENT IN THE PURIFICATION OF ANIMAL-CHARCOAL.

The Schedule referred to in these Letters Patent and making part of the same.

*To all whom it may concern:*

Be it known that I, CARL FRIEDRICH LUDWIG WANDEL, of Waldau, near Bernburg, in the Duchy of Anhalt, North German Confederation, have invented or discovered a new and useful Improvement in Revivifying Animal-Charcoal, by employing the alkaline salts of manganese, viz, the combinations of soda or potash with oxide of manganese, as:

And I do hereby declare that the following is a full, clear, and exact description of the same, and of the manner of operating therewith.

Animal-charcoal, when used in the decolorization of fluids, as sugar-liquors, sirups, alcohol, oil, &c., becomes charged with foreign matters it absorbed and removed from said fluids, and which fill and obstruct the pores of the charcoal, rendering it unfit for further use until such foreign matters be removed. These matters, as far as they consist of soluble salts, may be washed out by water. Lime may be removed by various acids, as hydrochloric or acetic acid; and the main portion of organic matter may be removed by hot or cold water, by various acids, or by alkalines, as potash or soda; but, for the removal of the remnants of these organic matters, the means hitherto known have shown themselves to be generally insufficient. These remained in the charcoal or bone-black, and became carbonized in the further act of revivification, viz, the re-burning of the charcoal. The presence of carbon in the bone-black, thus resulting from an insufficient revivification, accumulating every time the bone-black is used, and which, to effectually remove, no means have hitherto been known, obstructs the minute pores of said bone-black, rendering it valueless for revivifying-purposes, and involving serious expenses to the manufacturer.

My invention consists in the removal of the superfluous carbon in the bone-black by the use of, as strong oxidizers, the alkaline salts of manganese, which may be produced by combining soda or potash with oxide of manganese or hypermanganese, either of such manganese-salts answering the desired purpose. For this purpose, the bone-black is submitted to the ordinary process of revivification, and, being put into suitable vessels, of iron or copper, is treated with one of the above-named manganese-salts, for which purpose the salt is dissolved in water, the latter being in sufficient quantity to cover the bone-black in the vessel. Then the solution is poured on the bone-black, and heated slowly to the boiling-point, which is continued for about one-half hour, more or less, after which the liquid is allowed to flow off.

During this procedure, the above-named salts are reduced to peroxide or hyperoxide of manganese, and carbonate of sodium or potassium, respectively, while the carbon of the bone-black has become oxidized.

For the removal of these substances, the bone-black is then treated with water and muriatic acid. Thus the liquid drawn off from the bone-black is replaced by a sufficient quantity of water, in order to wash it. Then the muriatic acid is added to the water, for the removal of the peroxide or hyperoxide of manganese. After this, the bone-black is again washed with water, when it is ready for re-burning.

One per cent. of either of the above salts is sufficient for every per cent. of carbon to be removed, while two per cent. of muriatic acid is necessary for each per cent. of the salt employed.

What is here claimed, and desired to be secured by Letters Patent, is—

The use of the above-named salts, as oxidizers, in the revivification of animal-charcoal, substantially as specified.

This specification signed by me, this 12th day of January, 1869.

CARL FRIEDRICH LUDWIG WANDEL.

Witnesses:
CARL HEINRICH KNOOP,
EDWARD JUSTUS THODE.